(12) United States Patent
Belanger et al.

(10) Patent No.: US 8,145,793 B1
(45) Date of Patent: Mar. 27, 2012

(54) SYSTEM AND METHOD FOR DISTRIBUTED CONTENT TRANSFORMATION

(75) Inventors: David Gerald Belanger, Hillsborough, NJ (US); Steven Michael Bellovin, Westfield, NJ (US); Maria F. Fernandez, Madison, NJ (US); Robert J. Hall, Berkeley Heights, NJ (US); Charles Robert Kalmanek, Jr., Short Hills, NJ (US); Kathleen McKenna, Bellevue, WA (US); Divesh Srivastava, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1188 days.

(21) Appl. No.: 10/978,549

(22) Filed: Nov. 1, 2004

Related U.S. Application Data

(60) Provisional application No. 60/517,146, filed on Nov. 4, 2003.

(51) Int. Cl.
*G06F 15/16* (2006.01)
*G06F 15/173* (2006.01)

(52) U.S. Cl. ......... 709/246; 709/230; 709/232; 709/236
(58) Field of Classification Search .................. 709/246
See application file for complete search history.

(56) References Cited

U.S. PATENT DOCUMENTS

| | | | |
|---|---|---|---|
| 6,643,684 B1* | 11/2003 | Malkin et al. | 709/206 |
| 6,651,120 B2* | 11/2003 | Chiba et al. | 710/65 |
| 6,744,782 B1* | 6/2004 | Itakura et al. | 370/466 |
| 6,766,296 B1* | 7/2004 | Adachi | 704/246 |
| 6,845,452 B1* | 1/2005 | Roddy et al. | 726/11 |
| 7,058,698 B2* | 6/2006 | Chatterjee et al. | 709/218 |
| 7,076,543 B1* | 7/2006 | Kirti et al. | 709/223 |
| 7,131,116 B1* | 10/2006 | Krishna | 717/136 |
| 7,172,122 B2* | 2/2007 | Alleshouse | 235/462.01 |
| 2002/0016818 A1* | 2/2002 | Kirani et al. | 709/203 |
| 2002/0107985 A1* | 8/2002 | Hwang et al. | 709/246 |
| 2005/0015440 A1* | 1/2005 | Solot, Jr. | 709/203 |
| 2005/0044197 A1* | 2/2005 | Lai | 709/223 |
| 2005/0144452 A1* | 6/2005 | Lynch et al. | 713/170 |
| 2005/0288939 A1* | 12/2005 | Peled et al. | 705/1 |
| 2006/0200761 A1* | 9/2006 | Judd et al. | 715/517 |
| 2006/0294183 A1* | 12/2006 | Agnoli et al. | 709/203 |

* cited by examiner

*Primary Examiner* — Jeffrey Pwu
*Assistant Examiner* — Shaq Taha (57) ABSTRACT

A distributed transformation network provides delivery of content from a content publisher to a content recipient. Content from the content publisher is received at an entry node of the distributed transformation network and transmitted to a transformation node in the distributed transformation network. The content is transformed according to publisher, recipient or network administrator specifications and transmitting to delivery nodes which deliver the transformed content to the content recipient. The published content may be in an XML-based format and transformed into an XML-related format or any other structured language format as desired in the provided specification.

47 Claims, 5 Drawing Sheets

SYSTEM AND METHOD FOR DISTRIBUTED CONTENT TRANSFORMATION

RELATED APPLICATION

The present non-provisional patent application claims priority to U.S. Provisional Patent Application No. 60/517,146 filed on Nov. 4, 2003, the contents of which are incorporated herein by reference.

BACKGROUND OF THE INVENTION

1. Field of the Invention

The present invention relates to networked content distribution and more specifically to a distributed XML transformation system and method.

2. Introduction

A system for networked content distribution at a large scale typically comprises multiple classes of content publishers and of content recipients. For example, a company may have a local area network where hundreds of employees are communicating with the network and distribute content to each other in a variety of different formats. The network may be any network such as the Internet, a wireless network, virtual private networks (VPNs) and so forth. An example of the challenge may be that a person generates a document in a format such as PostScript® and emails or communicates the document to a set of persons via the network. A recipient may not have means to view the postscript document. For example, a recipient may have a word processing application such as MSWord and not be able to view the postscript document.

Another example relates to communication between a webserver and a wireless device such as a personal digital assistant or smartphone that can achieve access to the interne. The smartphone is a mobile computing device and commonly contains a much smaller screen size than a laptop or desktop computer. This presents a challenge when a person using a desktop computer desires to publish data or a document over a network to the web recipient (other delivery methods in addition to the web are also contemplated) where the recipient has a reduced screen size for viewing.

Yet another example relates to content that is created in various formats, such as any of a plurality of XML format schemas that is to be transmitted to content recipient. Each recipient may have different software or a different operating system and may not be able to view or take advantage of features of the content in the published format. Further, each recipient or the publisher may have no method of controlling how the content is created to be transmitted. Details of the XML format are known to those of skill in the art. As an example, U.S. Pat. No. 6,748,569, incorporated herein by reference, provides some background on the use of XML.

There are many different types of content that may be distributed over a network by content providers. These may include graphical, text and video and multimedia presentations in various formats. What is needed in the art is a system and method of enabling the easy communication of content between content publishers and recipients of the content. Further what is needed is a system and method of enabling both publishers and recipients of content to control how content is transformed between publishing and reception.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention provides a distributed network and a method of transforming content from a publisher to transmit to a recipient. A distributed transformation network receives the published content at an entry node of the network and transmits the content to a transformation node in the network. The content is transformed according to publisher, recipient or network administrator specifications and transmitting to delivery nodes which deliver the transformed content to the content recipient. The published content may be in an XML-based format and transformed into an XML-related format or any other structured language format as desired in the provided specification.

In one aspect of the invention, XML-based content is transformed into XML-based content with modification of data associated with the content. In this sense, the content is not "transformed" into a different format but data may be altered, removed, or added to the content. An example of this is if the content is being used with a store that sells goods, then as content is transmitted through the network, data may be added during the transformation related to how many widgets were sold in a week. In this regard, the format of the content does not change but data within the content may be modified to reflect a change in a parameter or a value. Of course, this data may relate to any kind of information such as, e.g., cost, inventory, sales, stock prices, news, and so forth.

There are many scenarios to which the invention can apply. For example, companies that sell products may be able to include a content publishing chip on products that emits radio frequency identification data (RFID) that can be received, converted to an XML-based format, processed, transformed and received by a recipient in an appropriate format. Various security means may also be employed at nodes within the distributed network to prevent hacking, credit card fraud and other possible problems.

Another aspect of the invention provides for monitoring, administration and optimization of the receipt, transformation and delivery of content from publishers to recipients. These processes provide for specifications and policies that are administered to optimize the performance and desirability of the performance of the distributed network.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention. The present invention relates to a distributed XML transformation system architecture and method.

Content provided by publishers and consumed by recipients may advantageously enter or exit the content-distribution system at diverse, geographically distributed points in a network. The network referred to herein is not meant to be any specific type of network or any network operating according to a single protocol. The Internet, a local area network, a wireless network, or any other type of network may be applied to the present invention. In addition, different recipient classes often require that content be transformed, filtered, rendered or aggregated into a format that is derived from (but different than) the format in which the content was published.

It is therefore preferable, that a networked content-distribution system supports large numbers of publishers and recipients and also supports the transformation of published content to the content format required by recipients. By using a distributed transformation system for transforming content between a publisher and a recipient, rendering and presentation of content may be done advantageously in a timely fashion. In some cases, transformation can occur on a real-time or near-real-time basis, within the networked content-distribution system. Because of the bursty nature of many data-intensive networked applications, it is difficult for a single application or enterprise to cost-effectively acquire and allocate enough capacity to handle worst-case traffic bursts. Thus, a third party providing network capacity on an as-needed, per-use basis could service many applications and enterprises both simultaneously and cost effectively.

The eXtensible Markup Language (XML) has emerged as a standard data-exchange format for data producers and consumers in e-commerce and other networked content-distribution applications. Those of skill in the art will understand the basic use of XML. In such applications, XML can be used to represent both message headers (which specify, for example, the intended consumer(s) of the content, delivery requirements, etc.) and the content payload itself. Additional constraints on the structure of the content may be provided by an XML schema, which may be embedded in or referenced from the content. This inclusion of data-about-the-data (headers, schema, or "meta-data") makes XML an example of a "self-describing data format". Other types of self-describing data formats are also known in the art as well. These include, for example, formats where part or all of a data item contains procedural data, such as compiled programs or methods. These also include, for example, formats where part or all of a data item is compressed via some encoding; the encoding may be an information preserving encoding, so that it could, for example, be inverted to reproduce the original input item, or it may be a "lossy" encoding, so that only some abstract or approximation of the original item may be recovered.

Transformations of XML content are often expressed in XML transformation languages, such as XSLT, XPath, or XQuery. Clearly, other self-describing data formats may have transformation specification languages defined for them of a similar character as those for XML-based formats.

Note that in the description to follow, wherever "XML" and "XML transformation" are literally referenced, one skilled in the art understands that the invention covers the case of substituting any self-describing data format together with its appropriate transformation language or formalism. In particular, all future versions, variants, specializations, and evolutions of XML and XML transformation languages that are self-describing data formats are understood to be within the scope of the present invention.

The present invention, a distributed XML transformation system (DXTS) network architecture for content transformation and delivery, comprises a network connecting content publishers, transformers and recipients, entry nodes, which accept content from publishers in an XML-based format, transformation nodes, which transform/render content into a form required by a recipient according to a specification written in an XML transformation language and delivery nodes, which deliver content to recipients, possibly accepting requirements from recipients and delivering rendered content to them. The term rendering is broad in that content may be delivered or rendered to either a display, to a database or to some other destination such as data warehousing, or into a database for rendering by some other tool. Therefore, this network may also be referred more generally as a distributed transformation network (DTN). The specifications may be provided by a content recipient, content publisher, a network administrator or a combination of these entities. For example, the combination of these parties that have input into the specifications creates a multi-stakeholder entity that as a group determines the final way in which content is transformed in the network. Further, the specification for transformation may be the result of a negotiation either manual or automatic between recipients and content providers. For example, the negotiation may relate to cost, volume, technical details of the translation, breadth of multimedia content in the translation versus cost, propriety concerns, security and authorization, information ownership, and so forth (e.g., whether multimedia published content is transformed into a text message or whether the transformed content maintains all the multimedia features of the original.). The authorization information may relate to the person with the device (e.g., via voice, fingerprint, password ID, and so forth) or may relate to security associated with a computing device such as an encrypted key on the device or other means of identifying the particular device as secure.

Figure 1:
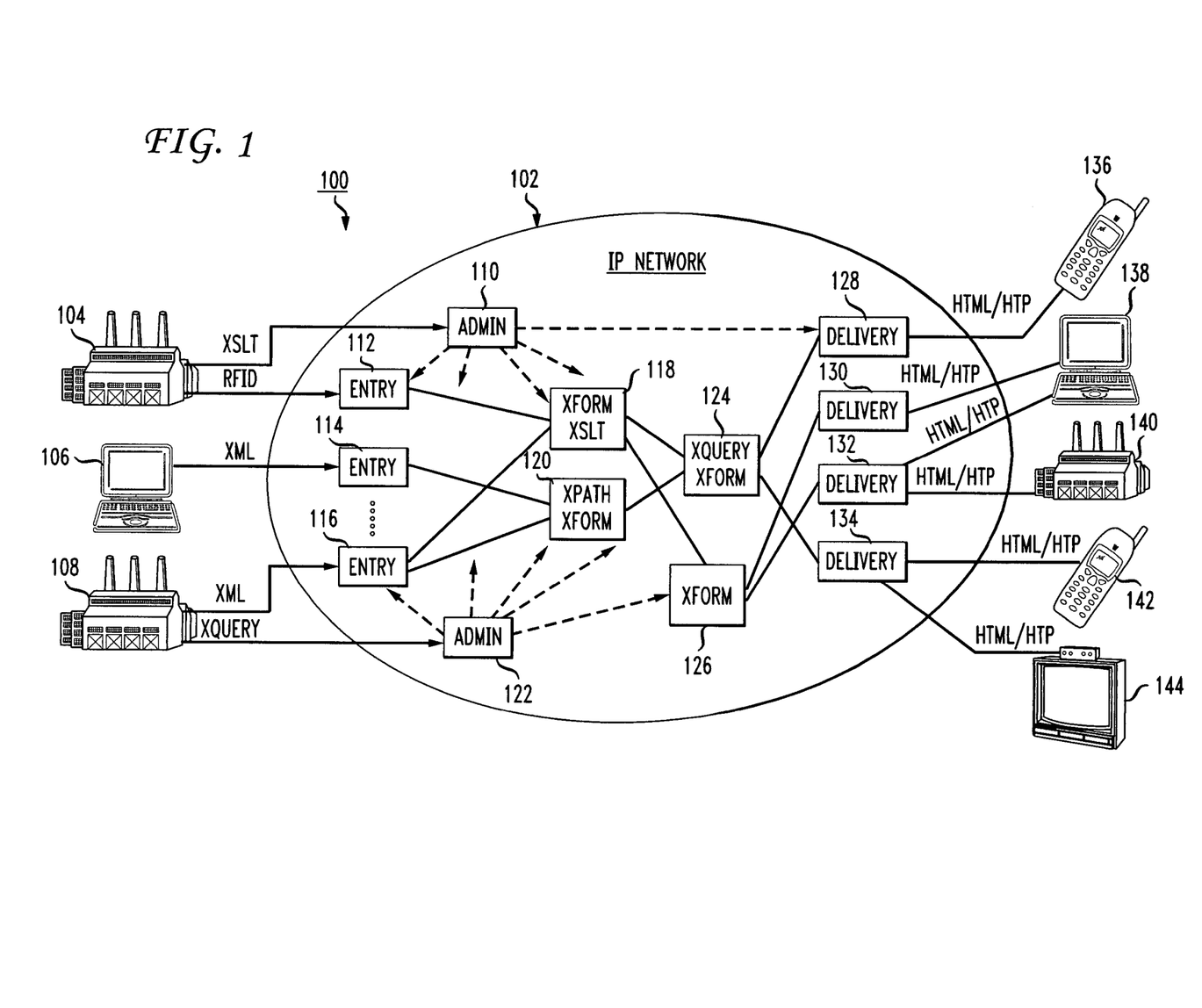
FIG. 1 illustrates a first embodiment of the invention.

Note that the nodes named above may be, but need not necessarily be, physically distinct from one another. An illustrative embodiment of this architecture is depicted in FIG. 1. FIG. 1 illustrates an architecture 100 that includes a network 102 such as an IP network. Various companies 104, 108 and 140 are shown as communicating with the network 102. Of course, the companies shown may represent homes or another source or destination for content. Various computing devices 106, 136, 138 and 142 also communicate with the network 102. The computing devices may be computers, handheld devices, wireless phones, PDAs or any other computing device.

Companies 104, 108 and computing device 106 communicate with their respective entry nodes 112, 114, 116 into the network 102. Administrative nodes 110, 122 accept transformation specifications from locations such as from the companies 104, 108 (or recipients and so forth) and distribute appropriate instructions derived from the transformation specifications to entry 112, 114 and 116, transformation 118, 120, 124, 126 and output nodes 128, 130, 132 and 134.

In an alternate aspect of the invention, an additional input node (not shown) accepts data in a non-XML format and a node transforms the non-XML data to XML prior to XML transformation and content delivery. In another alternate aspect of the invention, the input, transformation and output nodes incorporate an infrastructure (such as the Security Assertion Markup Language—SAML) for security and digital rights management of content. For example, security and digital rights management may be processed on any one of the entry nodes, transformation node or delivery node. Alternately, digital rights management/security may be operational on any combination of these nodes in the network.

The transformation for content can be specified in any of a number of XML transformation languages, including but not limited to, XSLT, XQuery, and XPath. "XML" and "XML transformation" can be replaced by any other self-describing data format together with a suitable transformation formalism. For example, this could be a future version of XML and a future version of XSLT.

A requirements notification process may also be employed (from publisher, recipient, or system administrator to system) which provides input to at least one node and influences the course of the transformation and content delivery. This could take many forms, including but not limited to dedicated single purpose links, simple query formats like HTTP queries, or negotiation protocols similar to many existing security and quality-of-service negotiation protocols. The notification process may preferably be initiated at a notification node (not shown) but may be included at any location or node within the network.

For example, this notification is preferably performed by an administrative node but in this regard any node may include administrative functions. The purpose of the administrative node is where notification requirements are entered into the system. For example, there does not have to be a separation between administrative functions and other functions. The requirements notification may be sent by an end recipient to tell a webserver or other node about the recipient's computing device and its physical capabilities so that content may be properly formatted for the device. The specifications may also relate to the logical software on the device and those capabilities, such as what version of software is operating and so forth. Therefore, the administrative functions may be spread out over different nodes, exclusively the function of a node, or part of the functionality of a single node.

The requirements notification process allows recipients and end users to inform the transformations so that particular needs are met. This may supplement the guiding transformation specification provided by the publisher, or it may actually be the primary transformation specification, depending on the application requirements. An example of the use of this would be for a portable device to notify the system of its screen size, input capabilities, bandwidth limitations, memory and/or processing capability, software capabilities, operating system capabilities, software versions, security issues and so forth. These issues preferably relate to recipient computing devices but may also relate to publisher computer device capabilities. In this manner, the XML content can be tailored to it by the transformation and delivery nodes.

The transformations can be implemented by software on a general purpose computing platform or by dedicated hardware support in specialized appliances. These can be mixed in a single embodiment. A transformation can be done on demand (i.e., at the time of the recipient query) or could be one prior to submission of the recipient query and the result stored for later delivery to recipients. Content can be delivered only when the recipient asks for it, or it can be distributed using the "push" technique: As soon as the content arrives and is transformed, it can be immediately transmitted to recipients.

Policies may be explicitly implemented governing how long data is stored/held within the DXTS. For example, in one embodiment an application could hold fixed-allocation XML content until it is replaced by newer published content, while the delivery servers could cache transformed copies of the data. As another example, a push-based application could distribute transformed content at the time it is generated, not storing it beyond that time at all (so, if a client is off-line during a "push", the client misses that push). Many other policies are possible, and diverse policies can coexist simultaneously within the DXTS.

Content delivery can be done on a "best-effort" basis (with no guarantees of timeliness or even of delivery) or can be done on any of a number of guaranteed bases. For example, it can be guaranteed to definitely be delivered, or it can be guaranteed within a certain timeliness constraint.

The transformation rules can be provided by the content publisher, by the content-distribution system administrator/owner, or by the recipient (or recipient-class administrator). In addition, a single transformation rule set could have parts contributed by each of these parties. The rendered format could be: XML, which conforms to the XML format of the original published content or which conforms to some other XML-related format (e.g., WML, NetML, or ebXML); an XML-like language, such as HTML; or an arbitrary binary, ASCII or other structured-language format. In other words, the transformation rules may require that an XML1-based format be transformed into an XML2-based format in preparation for another transformation downstream. This involves the transformation between XML schemas where data received in once XML-based format is transformed into another XML format.

The above invention, where the network has the capability to route at least one chunk ("chunk" means any grouping of information for transport or processing purposes, for example IP packet, SOAP-encapsulated message, remote method invocation instance, etc.) of data, is based entirely or in part upon the structure or content of the XML information contained in it.

The network could be implemented using an overlay network. The network could also be implemented as an overlay or companion network to a Virtual Private Network (VPN) or an IP-based network. In another sense, a VPN or an IP network may be termed as a building block for the network of the present invention. In this regard, there are two levels of networking, the basic IP-based network (or VPN or other network protocol) and the transformation network disclosed herein.

A DXTS network can be implemented on a shared infrastructure which provides the semantics of a private network among a set of publishers and subscribers, i.e., a virtual private DXTS. This implementation allows a DXTS infrastructure provider to offer secure DXTS services to different groups of recipients and publishers on a shared DXTS network. The network could be implemented using the Internet or some other inter-, intra-, extra-, or local network. The network could have wired devices, wireless devices, or a mix of both.

Figure 2:
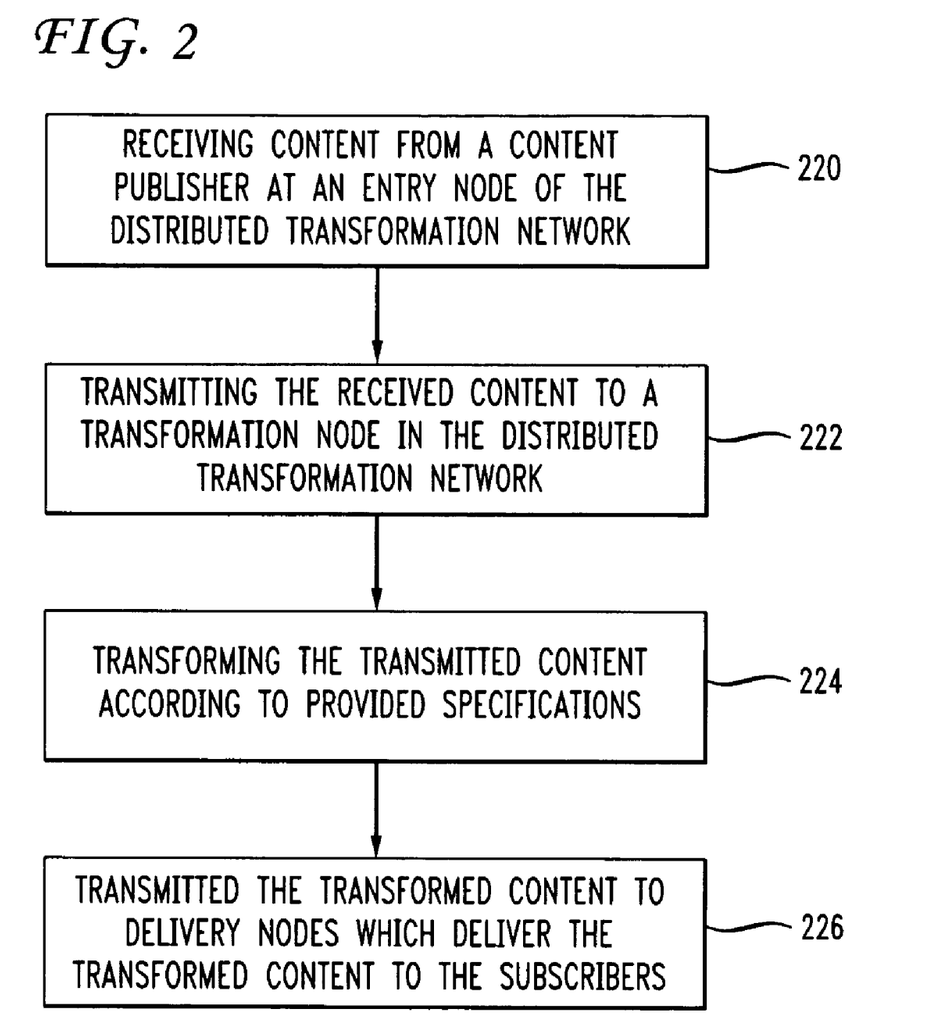
FIG. 2 illustrates a method aspect of the invention.

FIG. 2 illustrates a method embodiment of the invention. The method relates to delivering content from a content publisher to a content recipient. The distributed transformation network is the means for delivering and transforming the content. The method comprises receiving content from a content publisher at an entry node of the distributed transformation network (220). The content is preferably received in an XML-based format but in the broadest terms of the invention it can be received in any protocol or format. The received content is transmitted to a transformation node in the distributed transformation network (222). This transmission may be between nodes if the entry node and the transformation node are physically separate, or the transmission may essentially be an intra-node process if a single node is handling both functions of entry and transformation. In general, while FIG. 1 shows distributed nodes, there are any number of variations where some or all of the functions of the nodes may be physically combined.

Continuing with FIG. 2, the method next comprises transforming the transmitted content according to provided specifications (224). The recipients can specify various types of information for processing the transformation. Some of these have been mentioned above, such as transformation on-demand, transformation when asked for, transformation as soon as content arrives, transformation according to best efforts and so forth. In addition, all of these specifications may also be provided by the publishers or a combination of publishers and recipients. Finally, after the transformation, the system transmits the transformed content to deliver nodes which deliver the transformed content to recipients (226).

One aspect of the invention utilizes two transmitting steps wherein a transmission occurs from the entry node to a transform node, and then a transmission to a delivery node. Another aspect of the invention only requires a single transmitting step wherein the entry node transmits the received data to a transform node that stores the transformed data before delivery to the end recipient. Furthermore, the entry or delivery node may perform the transformation. As an example, assume that there are a large number of recipient computing devices with different capabilities. One approach is to transmit data to the delivery nodes without performing a transformation. The data may be cached at this node or elsewhere. Then as a particular device requests data, then the transformation occurs "on demand". This approach reduces the computer processing time necessary to perform all the transformations. Furthermore, if the data is a webpage, the webpage may be updated before the demand for delivery and therefore, when a transformation does occur, it will be performed on the latest form of the data instead of having a transformation occur early and then not be delivered to the recipient until the data is stale. The entry node or the delivery node may cache and/or perform the transformations as necessary.

Furthermore, if there are many different types of recipient devices, there are advantages to sending the data to various delivery nodes where as a particular type of device requests the data, the transformation occurs for that particular device type. For example, a news service such as USA Today may create five different electronic versions of a front page of its newspaper. The various versions are created to accommodate the various recipient computing devices, for different cultures such as Japan and Europe. There may be a large number of transformations that need to occur for all the desired recipients. One aspect of the invention comprises performing the five transformations when the data is first received and then delivering the transformed data to the delivery nodes. A delivery node may be in Japan and correspond to the Japanese version of the content. Then upon request of a computing device, the transformed content is prepared and cached for delivery. In another aspect of the invention, a version of the content, before being transformed, is transmitted to a node such as a delivery node. Since the system does not know in advance the types of devices that will request the content, the system then waits until a computing device such as a smartphone or personal digital assistant requests the content. The content is then transformed and immediately delivered to the recipient device. In some cases with this scenario, it does not matter what kind of client computing device is receiving the content, each person gets the same distributed content.

In another example, assume a particular client such as a Palm Treo® or a Blackberry® device wants to view a CNN headline page. The Treo may instruct the server that it has a certain screen size that is color which indicates which version of the content to send. The system then transmits that version that is tailored to your device. The device may be a phone with a small display, a handheld computing device with a little larger screen or a desktop computing device with a relatively large screen. In the scenario just described, the transformation is done at the delivery node when it is requested or on-demand. Within the network, the entry node just delivers the data to the multiple delivery nodes without transformation.

There may be a cost analysis employed in the transformation/transmission process of content. For example, revenue may be obtained for received content based on computation costs, or rendering costs, aggregation costs, and so forth. In the context of the transformation network, charges may be made for various permutations of when and how complicated the transformation of content is for a particular user or charge plan.

Following are example embodiments for applications of interest. The first example is an XML-based multimodal web publishing system. An XML-based multimodal web publishing system may be implemented as follows. The publishers provide content in an XML-based format to the system's publishing input nodes. The system then stores and registers this data's availability to recipient interface nodes. A recipient then contacts an interface node, with the recipient's receiving device (such as a PC-based full web browser, PDA-based medium-screen browser, or cell-phone, tiny-screen browser) notifying the interface node of its requirements. These requirements dictate the selection of an appropriate transformation, implemented here as an XSLT rule set. This transformation is applied in the networked content-distribution system and a format conforming to the recipient's requirements is rendered and transmitted to the device.

Other aspects of the invention may admit the following variations: "content" could comprise static web pages, audio or video files, real-time communications such as voice or video calls, email, instant messaging sessions, distributed whiteboard applications (groupware) supporting distributed meetings, or any of a wide range of other types. On input, these would be presented in a suitable XML-based format. On output, they would be rendered as appropriate for the target device(s) or the technical capabilities of the computing device associated with the recipient. Alternative recipient device classes could include distinct browser brands or versions (e.g. Netscape 6 vs Internet Explorer 5), distinct cell phone brands, distinct PDA types, set top boxes, specialized embedded processor applications such as within car dash boards, and application-specific software modules like the interface to NeverLost route finding equipment in some rental cars. Infinitely many other examples are possible. The transmission format to the recipient could be in a number of different protocols, such as HTTP or WAP.

Another example may provide RFID transmission/transformation and delivery. Radio frequency identification, or RFID, is a generic term for technologies that use radio waves to automatically identify people or objects. The objects may be vehicles, products for sale or any other moveable object. There are several methods of identification, but the most common is to store a serial number that identifies a person or object, and perhaps other information, on a microchip that is attached to an antenna (the chip and the antenna together are called an RFID transponder or an RFID tag). The antenna enables the chip to transmit the identification information to a reader. The reader converts the radio waves reflected back from the RFID tag into digital information that can then be passed on to computers that can make use of it. A geographically distributed large-scale retail business (and the suppliers who provide products for sale through them, and their suppliers etc.) may require the embedding of RFID technology chips in each item.

Sensors in the various stores of the retail business record RFID events, such as when an item is delivered to the store, each time it is moved within the store, when it is sold (processed at the register), and when it exits the store. These data events may be captured by the sensors and encoded into XML-based object representations. This may be performed by an encoding node (not shown) that may be independent from other nodes or physically included with another node. They are then published into the RFID data system or provided to an entry node of the network for transformation and delivery. This system registers the data as available within the RFID data system. Recipient applications can request the data (either on an on-demand basis or via a push channel). The RFID data system can perform a transformation of the data for each recipient according to transformation rules provided either by the administrators of the system or of the recipient class.

For example, one application could subscribe to product-leaving-store and product-sales events and report when an item leaves a store without being sold. The transformation performed is simple event filtering (e.g., discard item-arrival events or motion within the store) If performed in real time, this could support security and detection of shoplifting.

Another example of the invention in operation would be for reporting of item acquisitions and item sales, reporting all such events to a central inventory application at the home office. Again, the transformation performed is mostly filtering out of irrelevant events.

Publishing in a standard format, such as XML, is advantageous, because there are potentially many heterogeneous recipients (including members of the supplier chain as well as stakeholders within the sales company itself) each of whom may have their own distinct proprietary IT architectures. The DXTS-provided transformation can customize and render the data at large scale into the data format appropriate to the recipient.

Providing the transformations within the network itself is advantageous because many stores may generate large amounts of data per second that must be processed and distributed, possibly at real time or near-real-time speed, to recipients. Moreover, there is far more aggregate data present than any one recipient needs to see or could handle. Thus, by applying transformations within the network and by discarding unneeded data, a smaller data stream is delivered to and processed by each recipient.

Another embodiment of the invention relates to monitoring and auditing of inter-enterprise SAML application. As described in the Security Assertion Markup Language (SAML) Version 1.0 an OASIS Open Standard, SAML is "an XML-based framework for Web services that allows the exchange of authentication and authorization information among business partners. SAML enables Web-based security interoperability functions, such as single sign-on, across sites hosted by multiple companies. SAML incorporates industry-standard protocols and messaging frameworks, such as XML Signature, XML Encryption, and SOAP. The specification can be easily integrated in standard environments such as HTTP and standard Web browsers. Likewise, other security environments can use SAML as an authentication and authorization layer. SAML complements Web services standards, such as SOAP, which lack inherent security features."

An example application of SAML is to support single sign-on of authenticated users in an inter-enterprise application environment. In this example, the authenticated users are aircraft mechanics of airline companies who require access to maintenance documentation published by aircraft manufacturers. The SAML protocol is supported by the inter-enterprise application that connects aircraft mechanics with access points on the aircraft-maintenance floor to the service portals of aircraft manufacturers. The inter-enterprise application publishes SAML data (i.e., XML documents that conform to the SAML format) that make assertions about resources (e.g., maintenance documents), subjects (e.g., mechanics), attributes of subjects (e.g., mechanic's location, affiliation, and level of training), and authorization decisions about whether subjects are allowed to access certain resources. A sign-on event or an access-resource event may publish numerous SAML documents, which are consumed by applications that check the assertions and issue new assertions that permit the sign-on or access-resource event.

A networked content-distribution network could support SAML applications that require real-time or near-real-time monitoring or auditing of SAML events. For example, detecting user-identify fraud, in which multiple people attempt to sign-on using the same identifier, would require auditing SAML events and identifying sequences of events that would indicate fraud. Fraud may exist as fraudulent user activity, credit card fraud, un-authorized use of resources and off-line auditing of expense reports. In this application, a large scale DXTS has the advantage of providing a large data set from which patterns can be mined to extract indicators of fraudulent behaviors. Other examples of detection could be detection of credit-card fraud and off-line auditing of expense reports.

Another aspect of the invention relates to the DXTS allowing monitoring and control. A DXTS-with-Monitoring (DXTS/M) adds to the DXTS description above: A monitoring capability that provides performance or other management information to a party. This can advantageously provide audit information, performance feedback, abnormal behavior detection, alerting, billing or other typical monitoring enabled services to clients or recipients.

Figure 3:
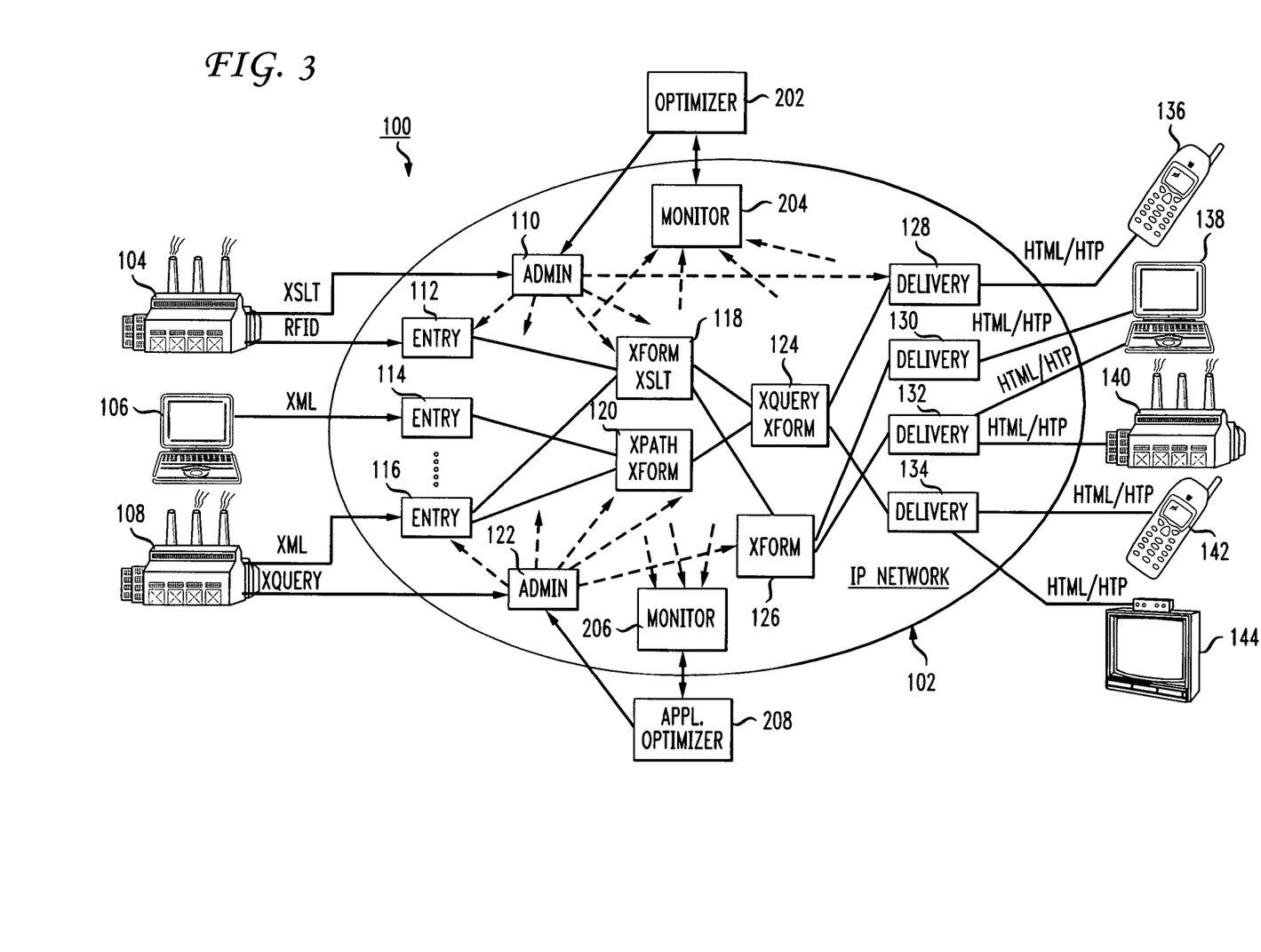
FIG. 3 illustrates a second embodiment of the invention.

Yet another embodiment of the invention relates to a DXTS-with-Monitoring-and-Control (DXTS/MC) that adds to the DXTS/M. This embodiment is shown in FIG. 3. A control input that allows some party to direct how content is routed between nodes and how parts of transformations are allocated among the nodes. A party may obtain monitoring information that can be used by the party in determining how to provide the control inputs appropriately. The monitoring nodes are shown as 204, 206. These are shown as receiving data from the various other nodes in the network 102. An optimizer 202, 208 will receive data from the monitor nodes 204, 208 and provide information to the administration nodes 110, 122 to improve performance. Typically, the monitoring can improve the efficiency, throughput, latency, or other performance metric of an application.

There are various other aspects of this invention. For example, a visualization interface can visually present the output data from a DXTS/M (or DXTS/MC). An alarm management system can raise and dispatch notifications of off-nominal conditions such as congestion conditions, etc., for a DXTS/M (or DXTS/MC). A DXTS/MC may have a protocol for expressing the control inputs.

Figure 4:
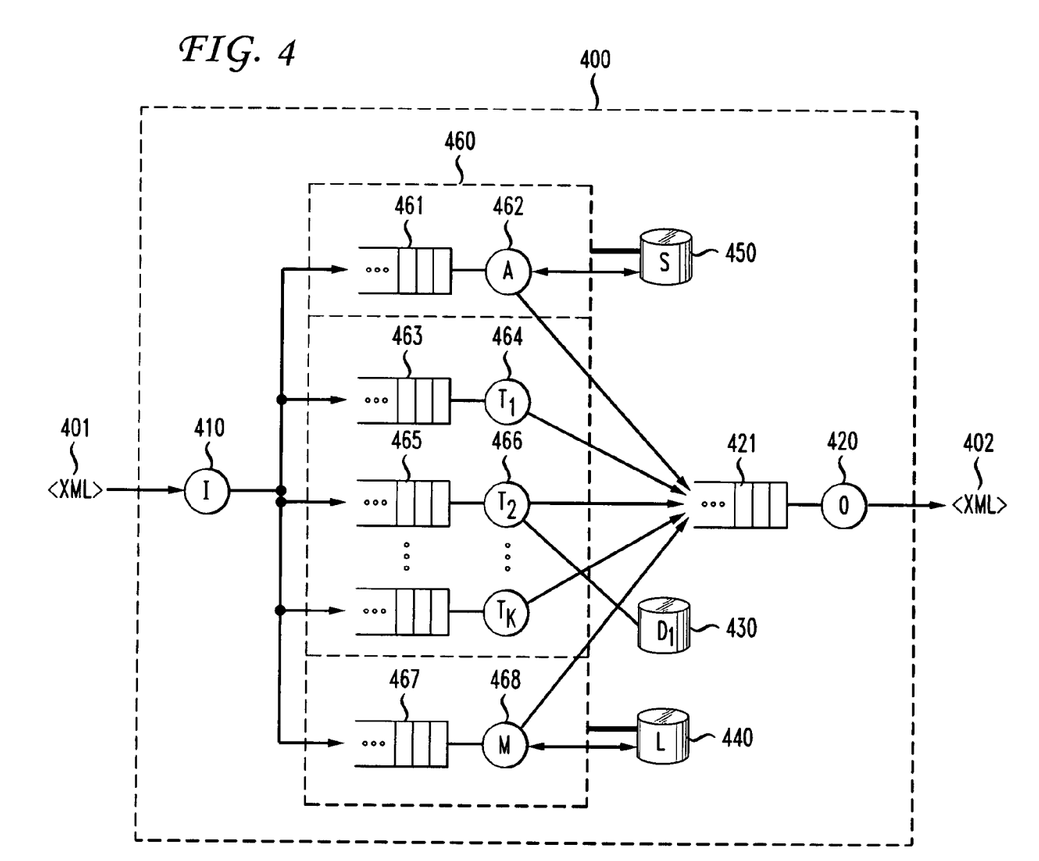
FIG. 4 illustrates a DXTS processing node.

FIG. 4 illustrates an example DXTS Processing Node. In a preferred embodiment, the DXTS Processing Node (400) is implemented on a networked computer using software engineering techniques as known to those skilled in the art. Node 400 accepts input via TCP/IP as an XML data object 401. Input server process 410 accepts the input using a defined communication protocol as known in the art. It examines addressing information contained in XML data object 401 and determines which transformation to apply. It then inserts 401 into the input queue (one of 461, 463, 465, 467, etc) of the appropriate transformation. The input queue holds the data object until the transformation processor is ready to process it.

Transformation processors (one of 462, 464, 466, 468) process their input queues as follows. For example, 464 removes the first data object from its queue 463 and applies the processing transformation defined for 464, called T1. The results of applying T1 are logged in log database L (440). If any transformation outputs are produced, they are placed into output queue 421. Note that some transformation processors may be attached to an application-specific database. For example, transformation T2 (operating at 466) may access and possibly modify application database D2 (430). This can enable aggregation-style transformations where many inputs over a period of time are aggregated (added, merged, etc). It can also help implement query-style transformations, where an input XML-based query causes a corresponding query to the database and then formats the results as an XML output object.

Input, output, and transformation processors can be implemented using standard software engineering techniques, such as by threads, processes, or entries in global state machine processors. The queues can be implemented using standard FIFO data structures techniques, using disk or other permanent storage medium as storage, so that objects are unlikely to be lost. Output processor O runs at processor node 420. Processor O successively removes XML objects (preferably containing addressing information) from the output queue 421 one at a time. It then transmits this out using TCP/IP as output XML data object 402.

Logging database L (database 440) preferably records all events of interest within processing container 460 for later management, auditing, and debugging purposes. Processing container 460 can be implemented using standard frameworks as are known in the art, such as products implementing the Sun Microsystems J2EE framework standard or the Microsoft .NET framework.

Control database S (database 450) preferably holds configuration information for processing container 460. This database tells the container which transformation to run on which processor/queue pair. It also holds configuration data for each transformation, such as connectivity, security, and authorization credentials.

Processor A (node 462), the "administrative processor", preferably accepts specially formatted XML descriptions of administrative operations, such as to add a transformation, to delete a transformation, to update the configuration data for a transformation, etc. Thus, Processor A has special privileges to read and alter control database S. The results of these operations can optionally be returned by processor A formatting the results (success/failure, resource usage, etc) into a defined XML format and sending it out through the output queue and processor.

Processor M (node 468), the "monitoring processor", preferably accepts XML-formatted queries for management information and recovers this information from logging database L (440). It then formats this into a defined output XML-based format and sends it out to the output queue.

Transformations A, T1, T2, . . . Tk, and M may preferably be implemented using XSLT processing software, as is known and available in the art, where the transformation specification is written in the XSLT language and stored in control database S. Other well known languages than XSLT can also be preferably used, such as XQUERY and XPATH. Different nodes can use different languages of these, or even different transformations within a single node can use different languages. In this embodiment, administrative actions like installing or deleting transformations are carried out by a designated administrative entity with special authorization credentials.

Figure 5:
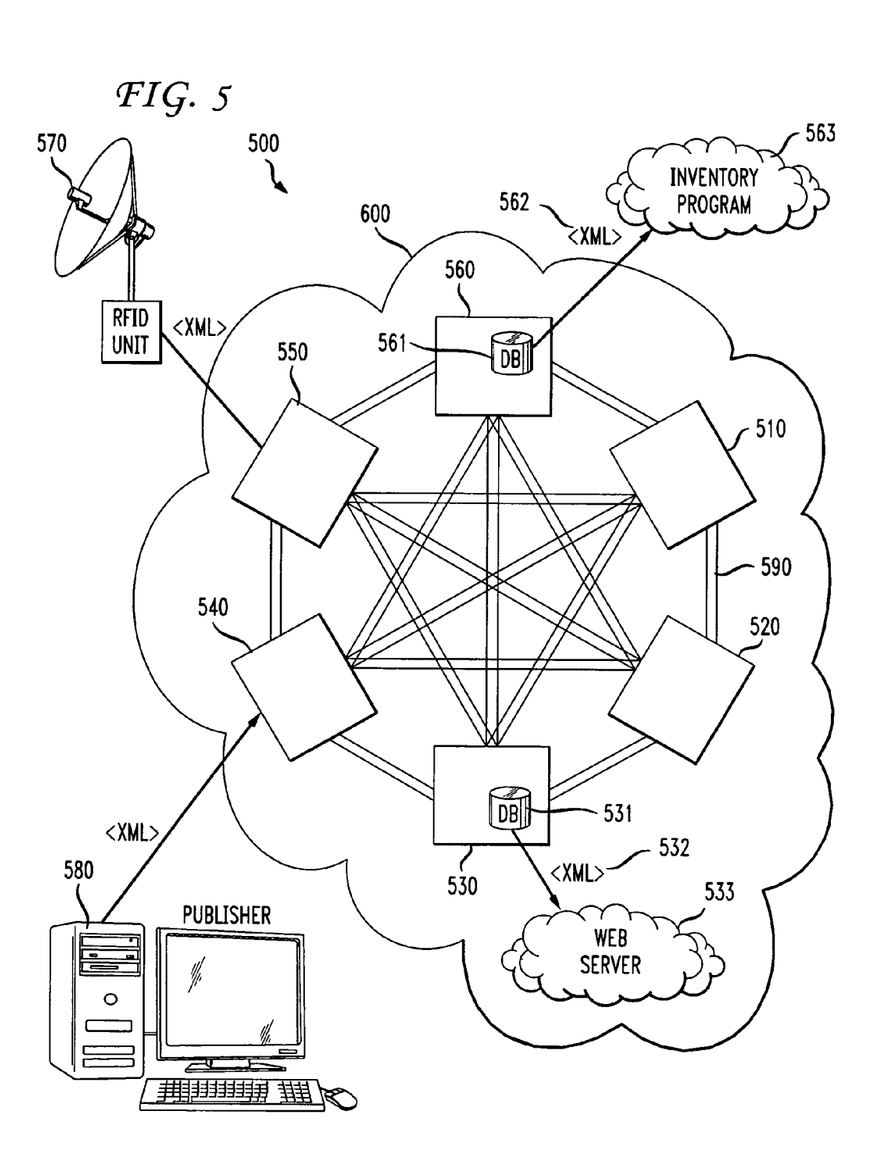
FIG. 5 illustrates a multi-node DXTS.

FIG. 5 illustrates an example multi-node distributed DXTS 500, which is shown as having six DXTS Processing Nodes (510, 520, 530, 540, 550, 560). These are networked together and a virtual private network (VPN) is preferably used to create a totally connected graph of VPN tunnels. Feature 590 represents one such tunnel. These nodes are not all identical as configured. For example, node 560 contains a database 561 for an RFID-related inventory application 563. This is accessed by the latter extracting XML objects 562 over the network. As another example, node 530 contains an application specific database 531 containing HTML pages 532 for extraction and use by a web server 533. Node 550 accepts XML inputs generated by an RFID reader unit 570 over a network connection. Node 580 accepts XML-based document descriptions from a publisher's computer 580.

Privacy and integrity of the network traffic is ensured by implementing the network as a VPN overlay network on a standard unsecure IP network 600 such as the public Internet. Authentication is handled by a system of keys and signatures mediated by a communication protocol as is known in the art. In this DXTS example, two applications are running. The RFID inventory control application works by sending "raw" RFID data objects in, transforming them in an application-specific way and depositing results into the database 561. Inventory program 563 then extracts this data as desired supporting inventory applications. The second application is a multimedia web publishing application. A publisher 580 sends a "master" XML document description into the network, which is then transformed into a number of different versions. The versions are then stored on the web server and clients having readers of differing characteristics, different authorizations, or even different locales can then retrieve the appropriate versions.

The six nodes of the network can be preferably arranged in any one of a number of configurations to support these applications. For example, they can support redundancy, so that when one application experiences a traffic "burst", more nodes can be allocated to support that application. When the burst subsides, these extras are then deallocated. Alternatively, they can be statically allocated to applications based upon payment for a guaranteed level of service agreement. Other variations will be obvious to those skilled in the art.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of delivering content from a content publisher to a content recipient via a distributed transformation network, the method comprising:
   receiving the content from the content publisher at an entry node of the distributed transformation network, wherein the content is in an XML based format;
   transforming, in the distributed transformation network, the content into transformed content according to a specification that is determined by the content publisher and a network administrator, the specification based on at least one of: a best-effort basis for delivery of the content and a guaranteed basis for delivery of the content; and
   transmitting the transformed content to the content recipient, wherein the transforming leaves the content in the same format but adds data to the content.

2. The method of claim 1, further comprising, after receiving the content at the entry node:
   transmitting the content to a transformation node in the distributed transformation network, wherein the transformation node transforms the content; and
   transmitting the transformed content to a delivery node which delivers the transformed content to the content recipient.

3. The method of claim 1, wherein the provided specification is at least partly written in an XML transformation language.

4. The method of claim 1, wherein the specification is further based on at least one of: on-demand transformation and transformation as content is received.

5. The method of claim 1, wherein the transformed content is rendered in an XML-based format.

6. The method of claim 1, wherein the transformed content is rendered in an XML-based format which conforms to the XML-based format of the content.

7. The method of claim 1, wherein the transformed content is rendered in a format that conforms to an XML-related format.

8. The method of claim 1, wherein the XML-related format is one of WML, NetML, ebXML.

9. The method of claim 1, wherein the transformed content is rendered in a format that conforms to at least one of one of an HTML-related format, an arbitrary format, ASCII and other structured-language format.

10. The method of claim 1, further comprising, before receiving the XML-based content at the entry node:
    receiving non-XML-based content at a non-XML-based entry node; and
    transforming the non-XML-based content into XML-based content for transmission to the at least one entry node.

11. The method of claim 1, further comprising:
    providing security and digital rights management to nodes within the distributed transformation network.

12. The method of claim 1, wherein the specifications relate to security parameters.

13. The method of claim 12, wherein the security parameters are one of authorization of a person and authorization for a recipient computing device.

14. The method of claim 1, wherein the specifications relate to at least one of the following recipient device capabilities: screen size, input capabilities, bandwidth limitations, memory and/or processing capability, software capabilities, operating system capabilities and software versions.

15. The method of claim 1, wherein the specification relates to the physical capabilities of a recipient computing device.

16. The method of claim 1, wherein the specification relates to logical software capabilities of a recipient computing device.

17. The method of claim 1, further comprising:
    monitoring nodes within the distributed transformation network to provide performance and management information.

18. The method of claim 17, further comprising:
    optimizing performance of the distributed transformation network according to the performance and management information received from the monitoring step.

19. The method of claim 18, wherein the performance and management information includes at least one of: audit information, performance feedback, abnormal behavior detection, alerting, monitoring enabled services to recipients and billing.

20. A distributed transformation network for delivering content from a content publisher to a content recipient, the distributed transformation network comprising:

at least one entry node in the distributed transformation network that receives the content from the content publisher, wherein the content is in an XML based format;

at least one transformation node that receives the content from the at least one entry node, and transforms the content into transformed content according to a specification that is determined by the content publisher and a network administrator, the specification based on at least one of: a best-effort basis for delivery of the content and a guaranteed basis for delivery of the content, wherein the transforming leaves the content in the same format but adds data to the content;

at least one administrative node that communicates the specification for content transformation from an entity to the at least one transformation node; and at least one delivery node that delivers the transformed content to the content recipient.

21. The distributed transformation network of claim 20, wherein the entity is one of a content recipient, content publisher, a network administrator and any combination of the same.

22. The distributed transformation network of claim 20, further comprising at least one non-XML-based entry node that receives non-XML-based content and that transforms the non-XML-based content into XML-based content and transmits the transformed XML-based content to the at least one entry node.

23. The distributed transformation network of claim 20, wherein at least one of an entry node, transformation node, and delivery node incorporate security and digital rights management of content.

24. The distributed transformation network of claim 23, wherein the security and digital rights management of content is the Security Assertion Markup Language (SAML).

25. The distributed transformation network of claim 20, wherein the transformation of the content is specified by at least one of the following transformation languages: XSLT, XQuery and XPath.

26. The distributed transformation network of claim 23, further comprising a requirements notification node that provides input to nodes within the distributed transformation network to manage the transformation and delivery of the content.

27. The distributed transformation network of claim 26, wherein the input to nodes within the distributed transformation network relates to at least one of screen size, input capabilities, bandwidth limitations, memory and/or processing capability, software capabilities, operating system capabilities, software versions and security issues related to a recipient computing device.

28. The distributed transformation network of claim 20, wherein the content is further transformed based on one of the following criteria: on-demand, at a specified time, a soon as possible, and based on whether new published content is received.

29. The distributed transformation network of claim 20, wherein the transformed content is one of WML, NetML and ebXML.

30. The distributed transformation network of claim 20, wherein the transformed content is in one of an HTML-based format, arbitrary binary format, ASCII and other structured language format.

31. The distributed transformation network of claim 20, wherein the distributed transformation network is a virtual private network.

32. The distributed transformation network of claim 20, wherein the transformation of the content is based on the physical capabilities of a computing device associated with the recipient.

33. The distributed transformation network of claim 20, wherein the transformed content is delivered to a recipient in one of the HTTP protocol and the WAP protocol.

34. The distributed transformation network of claim 20, wherein recipients and/or publishers have radio frequency identification technology associated with their respective computing devices.

35. The distributed transformation network of claim 20, wherein the content publishers publish content comprising radio frequency identification data, wherein the transformation nodes transform the content with radio frequency identification data according to the provided specifications.

36. The distributed transformation network of claim 35, wherein the provided specifications include specifications related to at least one recipient class.

37. The distributed transformation network of claim 35, further comprising: a radio frequency identification encoding node that encodes the radio frequency identification into XML-based data for transmission to the at least one entry node.

38. The distributed transformation network of claim 24, wherein SAML events are monitored in real-time.

39. The distributed transformation network of claim 38, wherein the SAML relate to one of detection of: fraudulent user activity, credit-card fraud, unauthorized resource use and off-line auditing of expense reports.

40. The distributed transformation network of claim 20, further comprising:
at least one monitoring node that provides performance and management information to an entity.

41. The distributed transformation network of claim 40, wherein the performance and management information includes at least one of: audit information, performance feedback, abnormal behavior detection, alerting, monitoring enabled services to recipients and billing.

42. The distributed transformation network of claim 40, wherein the at least one monitoring node enables publishers and/or recipients to direct how content is routed between network nodes and how parts of transformation are allocated among network nodes.

43. The distributed transformation network of claim 42, wherein the network nodes comprise at least one of entry nodes, transformation nodes, delivery nodes and administrative nodes.

44. The distributed transformation network of claim 42, further comprising:
at least one optimizer node that receives data from the at least one monitor node and provides information to at least one administrative node for improving performance of the distributed transformation network.

45. A method of delivering content from a content publisher to a content recipient via a distributed transformation network, the method comprising:
receiving the content associated with a movable object, the content including at least radio frequency identification data, wherein the content is in an XML based format;
encoding the radio frequency identification data into an XML-based data for transmission to at least one entry node of the distributed transformation network;

transmitting the encoded XML-based content to a transformation node in the distributed transformation network;
transforming the transmitted content according to a specification determined by a combination of the content publisher and a network administrator, the specification based on at least one of: a best-effort basis for delivery of the content and a guaranteed basis for delivery of the content, wherein the transforming leaves the content in the same format but adds data to the content; and transmitting the transformed content to delivery nodes which deliver the transformed content to the content recipient.

46. The method of claim 45, wherein the content including radio frequency identification data is derived from a person.

47. The method of claim 45, wherein the moveable object is a product for sale.

* * * * *